United States Patent [19]
Doty et al.

[11] Patent Number: 5,267,605
[45] Date of Patent: Dec. 7, 1993

[54] MICROTUBE ARRAY SPACE RADIATOR

[75] Inventors: F. David Doty; Gregory S. Hosford; Jonathan B. Spitzmesser, all of Columbia, S.C.

[73] Assignee: Doty Scientific, Inc., Columbia, S.C.

[21] Appl. No.: 578,762

[22] Filed: Sep. 6, 1990

[51] Int. Cl.$^5$ .............................................. B64G 1/50
[52] U.S. Cl. ..................... 165/41; 165/133; 165/904; 244/163; 428/632; 428/633; 428/668; 428/670
[58] Field of Search ............... 428/632, 633, 668, 670; 165/41, 904, 104.34, 133; 244/158 R, 163

[56] References Cited

U.S. PATENT DOCUMENTS

| | | | |
|---|---|---|---|
| 3,774,678 | 4/1971 | Glorisi | 165/101 |
| 3,890,456 | 6/1975 | Dils | 428/632 |
| 4,603,731 | 8/1986 | Olsen | 165/41 |
| 4,676,305 | 6/1987 | Doty | 165/158 |
| 4,727,932 | 3/1988 | Mahefkey | 165/41 |
| 4,738,304 | 3/1986 | Chalmers et al. | 165/41 |
| 4,770,232 | 9/1988 | Chubb . | |
| 4,789,517 | 12/1988 | Webb et al. | 165/86 |
| 4,825,650 | 5/1989 | Hosford . | |
| 4,830,097 | 5/1989 | Tanzer | 165/41 |
| 4,832,113 | 5/1989 | Mims et al. | 165/41 |
| 4,850,337 | 7/1989 | Collings et al. . | |
| 4,896,410 | 1/1990 | Spitzmesser et al. . | |
| 4,896,507 | 1/1990 | Hosford . | |
| 4,911,353 | 3/1990 | Deakin . | |
| 4,917,968 | 4/1990 | Tuffias et al. | 428/632 |
| 4,927,714 | 5/1990 | Priceman | 428/632 |
| 4,928,755 | 5/1988 | Doty et al. | 165/168 |

FOREIGN PATENT DOCUMENTS 0125620 5/1984 European Pat. Off. .
0191602 8/1986 European Pat. Off. .

OTHER PUBLICATIONS

"The Microtube-Strip Heat Exchanger—Space Power Applns. for Ultra-High Conductance Gas-Gas Exchangers", F. David Doty, Gregory Hosford and Jonathan B. Spitzmesser, Jan. 8-11, 1990.
*Space Nuclear Power*, Chapter 6, J. A. Angelo and D. Buden, Orbit Book Company, Malabar, Florida, 1985.
"Final Report On Development of Durable/Long-Life Radiator Coatings", D. Duffy, Apr. 1988.

*Primary Examiner*—Albert W. Davis, Jr.
*Attorney, Agent, or Firm*—Brumbaugh, Graves, Donohue & Raymond

[57] ABSTRACT

The MTS radiator consists of planar arrays of microtube strip modules, each of which contain two or three rows of about 200 properly spaced microtubes per row. The three-dimensional tubular titanium structure with support members between microtubes maximizes stiffness and strength per mass. The working fluid—typically hydrogen at 0.1 to 1 MPa—circulates through the microtubes, and most of the radiation occurs from their walls, which are only 0.2 to 0.4 mm thick. This allows specific mass below 1 kg/m$^2$. The operating temperature range is typically 200-650 K. The radiator's radiating surface comprises a heavily oxidized, metal alloy with a corrosion resistant, refractory alloy film deposited on it.

2 Claims, 5 Drawing Sheets

MICROTUBE ARRAY SPACE RADIATOR

BACKGROUND OF THE INVENTION

The field of this invention is heat exchangers, and, more particularly, ultra low mass radiators intended for aerospace power and thermal management applications using a single phase working fluid pumped loop.

The waste heat generated by power systems, instrumentation, and life support in spacecraft must be radiated into space using lightweight radiators. The primary system optimization criterion for most spacecraft systems is to minimize the specific mass, with efficiency and cost being of secondary importance. The most massive single component in space power systems such as Stirling cycles and closed Brayton cycles is the radiator. Current large radiator systems have a total mass of about 10 kg/m$^2$, although some proposed designs hope to achieve half that amount. The radiator often accounts for the majority of the total system mass in large power systems.

Systems utilizing heat pipes and biphasic fluids such as the carbon-fiber-augmented design by Olsen, U.S. Pat. No. 4,603,731, have been found to be suitable for low power systems. The honeycomb sandwich heat pipe design by Tanzer, U.S. Pat. No. 4,830,097 may have some advantages in small, high temperature systems. The pumped loop expandable coil design by Mahefkey, U.S. Pat. No. 4,727,932 appears inexpensive, but it is extremely vulnerable. The gas-particle concept by Chubb, U.S. Pat. No. 4,770,232, and the liquid droplet concept by Webb, U.S. Pat. No. 4,789,517 are also extremely vulnerable and susceptible to single-point failure. All of the above systems suffer from high specific mass (5–20 kg/m$^2$). Most of the prior art also suffers from a narrow range of effective radiating temperatures—typically 400–600 K., although some, such as that by Mims, Buden, and Williams, U.S. Pat. No. 4,832,113, are intended for 1000–1300 K.

The instant invention is a radical departure from the prior art in that all attempts to augment total surface area relative to tube surface area (e.g, the use of fibers or fins) are expressly avoided. A poor thermal conductor such as titanium—will often be used. The design problem is primarily a mechanical problem rather than primarily a thermal problem. The goal is to minimize radiating surface mean thickness while satisfying stiffness and protection requirements. This is achieved through the use of tubular radiating structures of small diameter in a modular design that permits numerous strengthening cross members and protective coatings. The modules are in some respects similar to the MTS exchangers by Doty and Spitzmesser of U.S. Pat. Nos. 4,676,305, 4,896,410, and 4,928,755.

Ceramic fiber shields, similar to those of Collings and Bannon, U.S. Pat. No. 4,850,337, are used for protection against space debris. Deakin, U.S. Pat. No. 4,911,353, discloses a metal spray technique for producing selective coatings.

SUMMARY OF THE INVENTION

The MTS radiator consists of planar arrays of MTS modules, each of which contain two or three rows of about 200 properly spaced microtubes per row. The three-dimensional tubular titanium structure with support members between microtubes maximizes stiffness and strength per mass. The working fluid—typically hydrogen at 0.1 to 1 Mpa—circulates through the microtubes, and most of the radiation occurs from their walls, which are only 0.2 to 0.4 mm thick. This allows specific mass below 1 kg/m$^2$. Operating temperature range is typically 200–650 K.

Radiator survivability is achieved by equipping each MTS module (about 1 m$^2$ radiating area) with high speed leak detection capability and isolating valves under independent microprocessor control to minimize coolant loss in the event of a puncture. Lightweight ceramic fiber fabric shields spaced about 100 mm from critical manifolds and mains provide protection from hypervelocity meteoroids with negligible increase in mass.

DETAILED DESCRIPTION OF THE PREFERRED EMBODIMENT

Coolant Choice

Hydrogen offers very low pumping power losses, is readily available for recharge in the event of loss, is usable from 25 K to well over 1000 K, has the highest specific heat (by a substantial factor) of all materials, and is relatively benign to the space platform environment. A hydrocarbon liquid such as toluene may require even less pumping power under certain conditions, and it will allow less coolant loss during the time between puncture and isolating valve closure, as the escaping coolant would quickly boil-freeze a solid plug in the punctured tube, but it lacks the other advantages of hydrogen. Hence, the coolant of choice for most missions will be hydrogen. The coolant loss during the 20–80 ms required to close the isolating valves will be quite small for a microtube puncture, even with H$_2$ at 1 MPa, owing to choking in the small diameter tubes.

Hydrogen diffusion through 0.1 mm thick aluminum at 600 K is under 2 grams per year per square meter at 1 MPa, but aluminum alloys have inadequate strength beyond 460 K. Alpha-beta titanium alloys are usable to at least 800 K but they are extremely permeable to hydrogen. Alpha titanium alloys are adequate to 650 K and have much lower hydrogen permeability. However, diffusion through alpha-titanium is still three orders of magnitude higher than through aluminum. A heavy Ti$_2$O$_3$ coating may form a sufficient diffusion barrier, but it is necessary to use aluminum-plated titanium to limit hydrogen loss in high temperature titanium radiators in extended missions.

Theory

Figure 1:
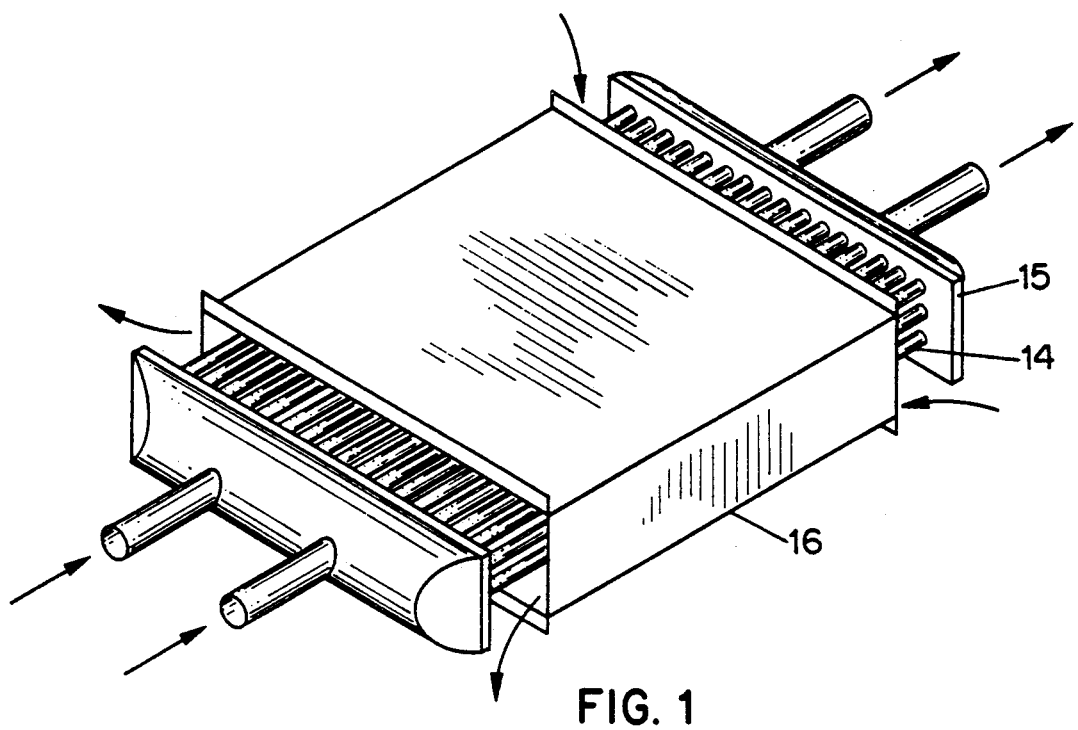
FIG. 1 illustrates an MTS module for counterflow gas-gas exchange according to the prior art.
Figure 2:
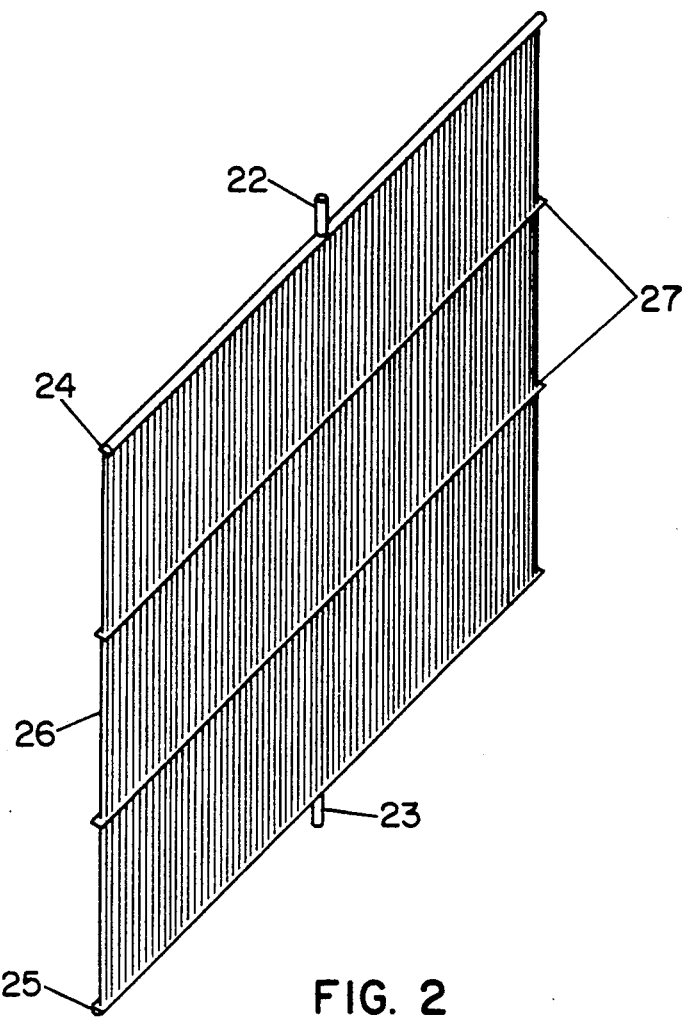
FIG. 2 is an isometric view of an MTS radiator module.

In an earlier patent, U.S. Pat. No. 4,676,305, one of the inventors discloses that optimum exchange between counterflowing gases is achieved by using small diameter tubes in a rectangular array to simplify manifolding and press fit assembly techniques and to facilitate uniform shell-side laminar flow. FIG. 1 shows a typical microtube-strip (MTS) gas-gas counterflow subassembly according to the prior art, with typically 8 rows of microtubes 14 manifolded to rectangular header tube-strips 15, and with counterflow cage 16. In U.S. Pat. No. 4,928,755 we disclose that similar concepts are advantageous for surface cooling applications. Here, we disclose the utility of related concepts for space radiators. FIG. 2 discloses the MTS space radiator module.

We first present a novel analysis of energy balance in the radiator module. Assume inlet fluid 22 temperature $T_{F1}$ and outlet fluid 23 temperature $T_{F2}$ (K). Then $$P_T = GC_P(T_{F1} - T_{F2}), \tag{1}$$

where $P_T$ is the thermal power (W), G is the fluid mass flow rate (kg/s), and $C_P$ is the constant pressure specific heat (J/kgK).

Assume that the surface area of the header caps 24, 25 is negligibly small compared to the total surface area of the microtubes 26. Further assume laminar flow conditions in the microtubes (we show later that laminar flow is optimum). It is well known that $$P_T = 4\pi n L_F k_F T_{\delta F}, \tag{2}$$

where n is the number of microtubes in the module, L is the microtube length, $k_F$ is the thermal conductivity of the fluid, and $T_{\delta F}$ is the log mean temperature difference between the fluid and the microtube wall.

Radiation from the microtubes is assumed given by the simple Stefan-Boltzmann law:

$$P_T = \alpha \pi \sigma n d_o O T_S^4, \tag{3}$$

where $\alpha$ is the surface emissivity, $\sigma$ is Stefan-Boltzmann constant ($5.67 \times 10^{-8}$ W/m$^2$K$^4$), $d_o$ is the microtube outside diameter (OD), and $T_S$ is the root mean surface temperature.

While the fourth-power temperature dependence in the above expression has often argued for very high radiating temperatures, our optimizations indicate that the low specific mass of the MTS radiator results in optimum radiating temperatures between 380 K and 650 K for power systems and as low as 200 K for small refrigeration systems. Over this temperature range, it is possible to utilize selective surface coatings to achieve high emissivity for wavelengths in the 2–20 μm range and low absorption below 2 μm (the inverse function of coatings developed by the solar collector industry). This will allow equation (3) to remain sufficiently accurate even in the presence of high solar irradiation and will allow more freedom in orientation and mission. Background temperature, field-of-view, and emissivity may then all be incorporated into an effective emissivity $\alpha$.

The tube-side pumping power loss $P_P$ can be expressed in terms of the tube-side mass flow rate G or flow velocity v (m/s) as follows:

$$P_P = 128\mu L(G/\rho)^2/(n\pi\mu d_i^4) = 8\pi\mu n L v^2, \tag{4}$$

where $\rho$ is the fluid density (kg/m$^3$), $d_i$ is the microtube inside diameter (ID), and $\mu$ is the dynamic viscosity (kg/ms) of the working fluid.

For typical power and heat pump applications utilizing highly recuperated closed Brayton cycles with compression ratios near 2.2, $$(T_{F1} - T_{F2})/T_M \approx 0.4, \tag{5}$$

where $T_M$ is the mean of $T_{F1}$ and $T_{F2}$. This ratio is small enough for reasonable accuracy using a simplified mean definition.

$$T_S \approx T_m - T_{\delta F}. \tag{6}$$

Since $T_{\delta F}$ is positive and the surface area is inversely proportional to $T_S^4$, $T_{\delta F}$ must be kept very small. Assume $T_{\delta F} < T_M/100$, i.e., the area penalty from the finite conductivity of the fluid is less than 4%. Further assume an effective emissivity $\alpha$ of 0.7, and $d_o = 1.4 d_i$ for the smallest tube sizes. Dividing equation (3) by equation (2) then gives an upper limit on $d_i$.

$$d_i > 0.04 \, k_F/(\sigma T_S^3) \tag{7}$$

Assume $P_P < 0.01 \, P_T$. Equations (3), (4), and (7) then require $$v < 0.035 \, (\sigma d_i/\mu)^{0.5} \, T_S^2 < 0.007 \, (k_F T_S/\mu)^{0.5}. \tag{8}$$

It can be shown from equations (7) and (8) and the definition of the Reynolds number Re that $$Re < 0.00028 \, \rho(k_F^3/\sigma^2\mu^3 T_S^5)^{0.5}, \tag{9}$$

which is well below 2000 for all anticipated conditions. Hence, the flow must be laminar.

Equations (1), (3), and (4) may be solved for L, again assuming $P_P < 0.01 \, P_T$.

$$L < 0.0036 \, (\rho C_P/T_M)(d_i^3/\mu\sigma)^{0.5} \tag{10}$$

Microtubing Size and Surfaces

For hydrogen at mean temperature 540 K, equation (7) shows that the microtube IDs must be less than 1 mm. For $T_M = 400$ K, the tube IDs must be less than 2.2 mm. It becomes difficult to produce the tubing and welds when the tube diameter is greater than 14 times the wall thickness. For small tubes of high strength alloys at low temperatures, the wall thickness need not be more than 0.15 mm for typical structural and pressure considerations. The maximum recommended microtube $d_i$ is about 2 mm. For 1 MPa hydrogen at $T_M = 540$ K, equation (10) shows that L must be less than 1.5 m. At lower temperatures, L can be much greater.

The above results also show that surface area augmentation by fins or fibers in high temperature radiators using moderate pressure hydrogen is not advisable.

The microtubes require adequate strength, low permeability to hydrogen, and micrometeoroid resistance. For temperatures in the 330–440 K range, the strength requirement is best achieved with a zinc- or magnesium- or copper-hardened aluminum alloy. At higher temperatures, an alpha-titanium alloy is better, and at lower temperatures, an aluminum-lithium alloy may be better. Hydrogen diffusion through titanium can be solved with an aluminum or copper plate at least 20 μm thick. Micrometeoroid protection is best achieved with a low density organic polymeric coating, 0.2 to 1 mm thick, for temperatures below 440 K. At higher temperatures, a magnesium plate of comparable thickness is the best choice.

The unoxidized high strength alloys typically have emissivities above 0.6. Suitably doped surface oxides of aluminum ($Al_2O_3$) or titanium ($Ti_2O_3$) or magnesium be formed by heavily anodizing the tubes to increase their emissivity above 0.95. The desired radiation surface selectivity may be achieved by vapor deposition of a sufficiently thin film (100 to 800 nanometers) of a corrosion-resistant refractory alloy (an alloy containing two or more of the following: platinum, rhodium, iridium, ruthenium, osmium) over the doped oxide.

Selectivity may be also obtained by deposition of a suitable, optically clear polymeric coating—i.e., a polymer with relatively low absorption in thin films in the visible range—over bright aluminum, since organic polymers are generally opaque to wavelengths in the 2–20 $\mu$m range. A polymeric film thickness of at least 20 $\mu$m is required for IR opacity, but a film thickness of at least 0.2 mm would usually be desired for micrometeoroid protection. When thick polymeric coatings are used for meteoroid protection and emissivity selectivity, the microtube inside diameter may need to be reduced slightly owing to the relatively poor thermal conductivity of the coating. Selective coatings to minimize absorption below 2 $\mu$m may be omitted on higher temperature modules, but they are essential on low temperature modules.

Manifolding and Structure

Cross-members 27 are welded to the microtubes as necessary (typically at spacings of 30–100 $d_o$) to achieve the required stiffness and alignment with long, fine tubes.

Figure 3:
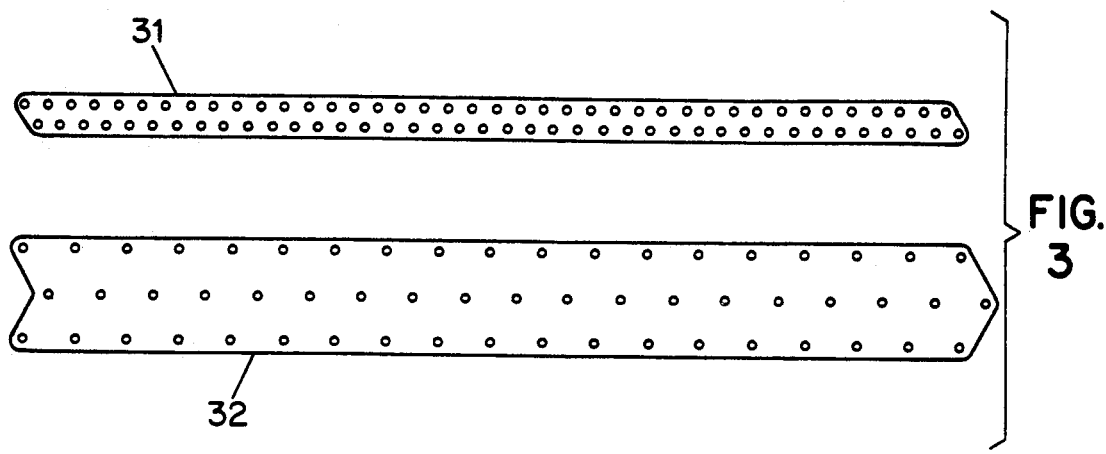
FIG. 3 shows tubestrip options with two and three rows respectively.

FIG. 3 shows two options for radiator header tubestrips 31 and 32 with two rows of tubes and three rows of tubes respectively. A single row of tubes would not provide mechanical rigidity, and more than three rows would necessitate excessively large header caps. Each row should contain at least 40 tubes, and perhaps 500. Diffusion welding combined with vacuum brazing is expected to be the preferred technique for highest reliability in joining the tubes to the tubestrips, but other welding processes may also be used. The center-to-center tube spacing within rows is typically 2 to 3 times $d_o$ when two rows are used, 5 to 6 times $d_o$ when three rows are used. Row spacing is typically 1.5 to 6 $d_o$. The header caps 24, 25, microtubes 26, cross-members 27, and tube-strips 31 will usually all be of the same base alloy to simplify welding and eliminate differential thermal expansion, although modules intended for operation at high $T_M$ may utilize different alloys for the hot and cold manifolds and tubestrips.

Figure 4:
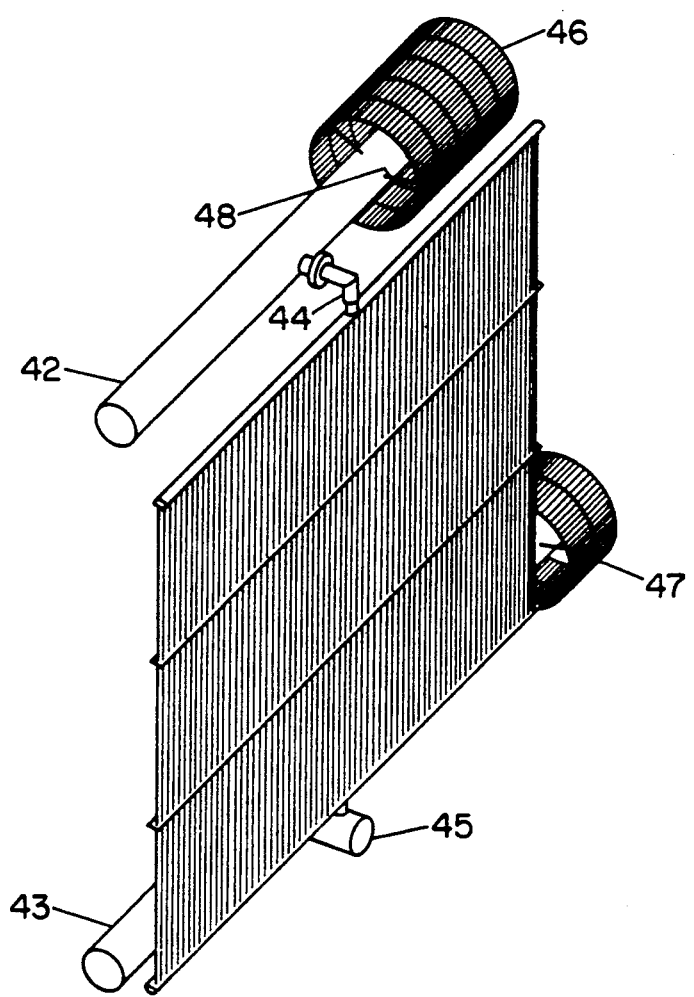
FIG. 4 shows a radiator connected to ceramic fabric shielded distribution mains.

FIG. 4 shows a radiator connected to ceramic fabric shielded distribution mains. The coolant of choice flows to and from the radiator module through suitable distribution mains 42, 43. Module valves 44, 45 allow flow distribution control and isolation of failed modules.

Space Hardening

Protection of the header caps, valves, and mains from hypervelocity projectiles is greatly enhanced by positioning one or more ceramic cloth shields around the vulnerable items, preferably spaced about 20–100 mm from the vulnerable items. FIG. 4 also illustrates the use of medium weight (0.15–0.3 kg/m$^2$) ceramic fabric shields 46, 47 over distribution mains 42, 43. Glass fiber threads 48 tied to the mains 42, 43 extend radially to the fabric shields 46, 47 to maintain their location. Prior to deployment, the shields will be collapsed and adjacent to the main for convenient storage. Upon deployment in space, a small amount of hydrogen gas is injected into the space between the shields and the main to "inflate" them. A plastic membrane may be bonded to the fabric to enhance deployment by gas confinement, but initial depressurization becomes more complicated. The ceramic fabric is required to have sufficient stiffness to maintain its tubular shape in microgravity space without internal gas pressure.

Protection of the microtubes is accomplished primarily through redundancy, by allowing failed units to be isolated from the distribution mains. This requires power and control distribution to the modules. The selective coatings will also provide some measure of protection against shortwave lasers, and a low density polymeric coating (such as polyimide, polyetherketone, polyamide, or polypropylene) or magnesium plate is effective against very small particles. A lightweight ceramic fabric bubble 0.07–0.15 kg/m$^2$) may also be deployed around the entire planar array for added protection of the high temperature modules, but radiation and reflections off ceramic fabrics would make them unsuitable for protection of low temperature radiators in the vicinity of high temperature radiators.

Figure 5:
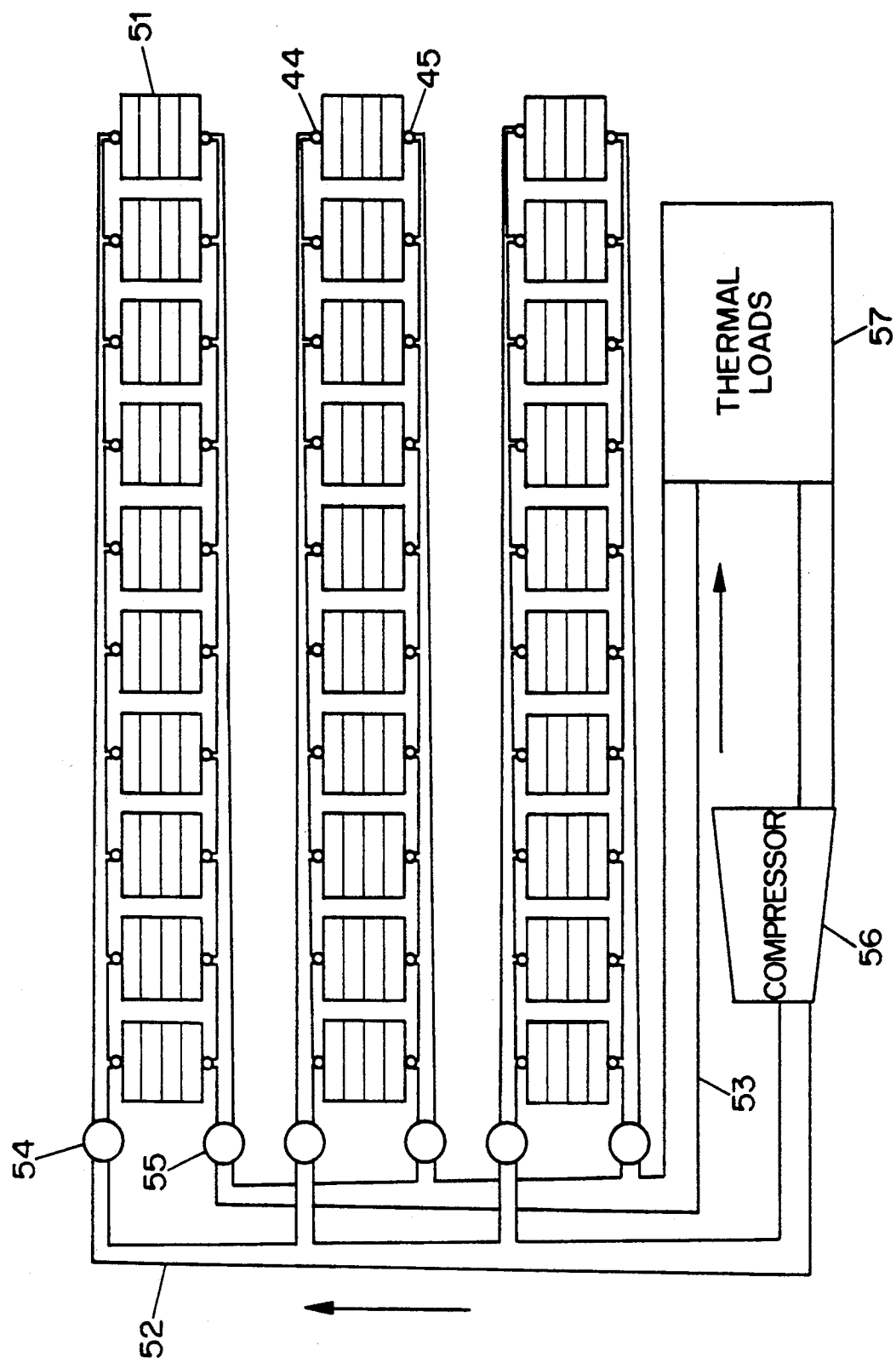
FIG. 5 shows a method of arranging and manifolding a large number of MTS modules into a planar array as part of a thermal management system.

FIG. 5 shows a radiator system which includes a large number of MTS radiator modules, arranged first into independent module strings 51, with suitable distribution mains 52, 53, then into a planar array. Module valves 44, 45 and string valves 54, 55 allow flow distribution control and isolation of failed modules and strings respectively. A spacecraft would typically deploy one or more planar arrays on each side, somewhat like large solar panels. Most of the strings in the arrays would be functionally in parallel, with $T_M$=540 K ($T_{F1}$=640 K, $T_{F2}$=440 K), providing secondary loop cooling for dynamic power systems with compressor inlet temperatures of 450 K. One module string may radiate in the 330–440 K range for high temperature electronic device cooling. A number of module strings will radiate in the 250–330 K range for electronic device cooling, cabin environment control, direct refrigeration, and cryogenic heat pump sinks. A pump or compressor 56 circulates the coolant serially through the various loads 57 requiring cooling, beginning with the lower temperature loads and proceeding through higher temperature loads, then to the radiator array.

The low cabin pressure minimizes the hazards associated with a hydrogen leak, but hydrogen leak detection and avoidance measures will be required. One option is to use helium instead of hydrogen for the lower temperature systems—where the specific heat, thermal conductivity, and viscosity advantages of hydrogen are inconsequential. The low specific mass of the MTS radiator combined with selective surfaces will usually make direct radiative refrigeration a better option than heat pumps at least down to 260 K.

It should be noted that the planar radiator geometry on a maneuverable spacecraft allows enhanced low temperature performance compared to a spherical radiator owing to the directionality of the absorption of background solar radiation. Moreover, the planar geometry results in a smaller collision cross section than other options at high spacecraft velocities.

Control

Figure 6:
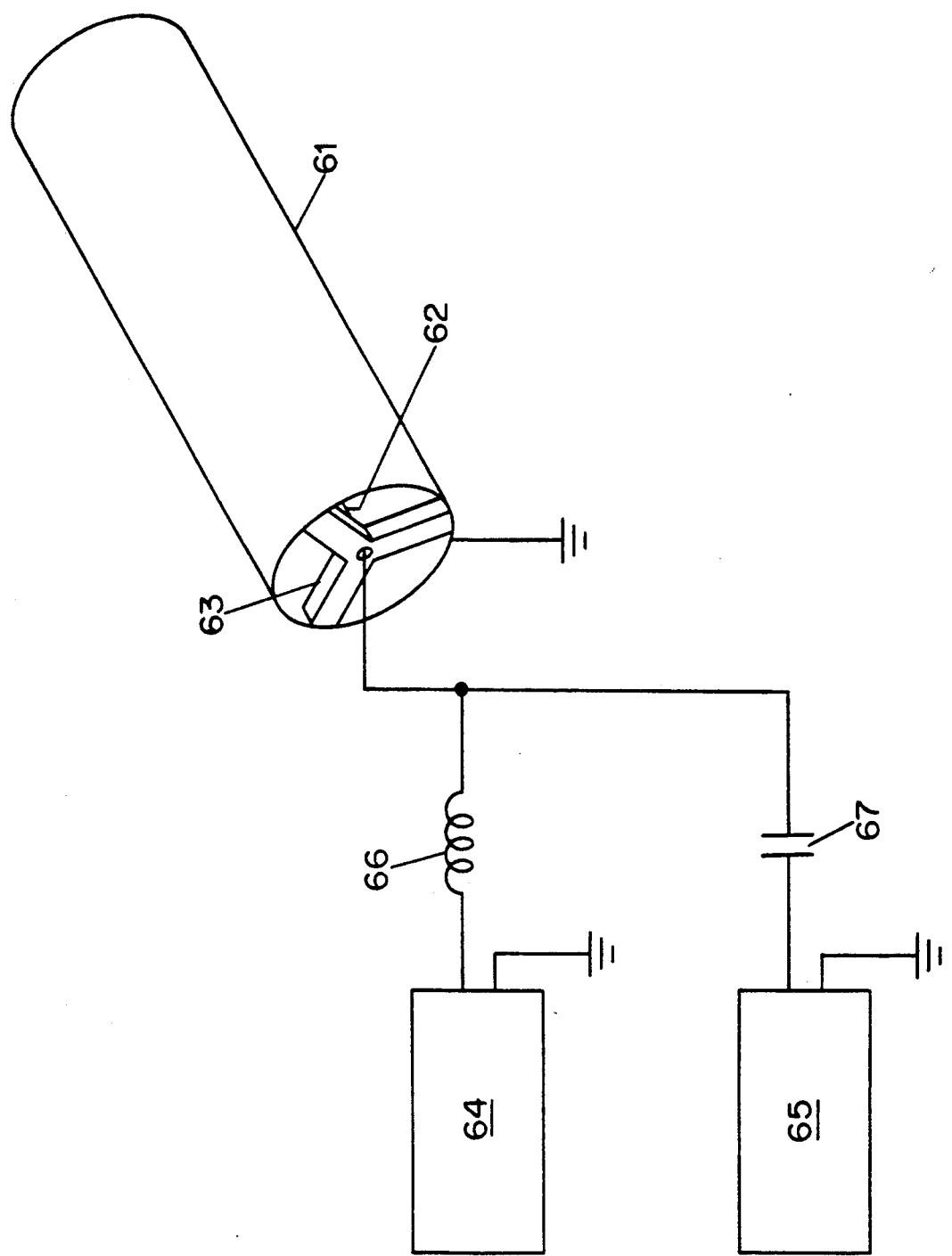
FIG. 6 shows the preferred method of coaxial electrical power and control distribution.

A convenient method of distributing both power and control is via a coaxial line as shown in FIG. 6 utilizing the cold (return) main as the outer conductor 61 to provide RF shielding and mechanical support and protection. A tubular aluminum alloy center conductor 62 is supported inside the cold main by star-shaped insulators 63. A DC power source 64 maintains a voltage of 5 to 12 VDC on the center conductor 62 supplying electrical power to the module valves 44, 45 and the string valves 54, 55. The radiator central control system 65 superimposes radio frequency (RF) control signals on the DC. It transmits and receives data to and from the module valves 44, 45 and the string valves 54, 55 using the same aluminum conduit 62 as the DC power supply. A low pass filter 66 isolates the DC power source 64 from the RF control signals. A high pass filter 67 isolates the radiator central control system 65 from the DC power in aluminum conduit 62.

Figure 7:
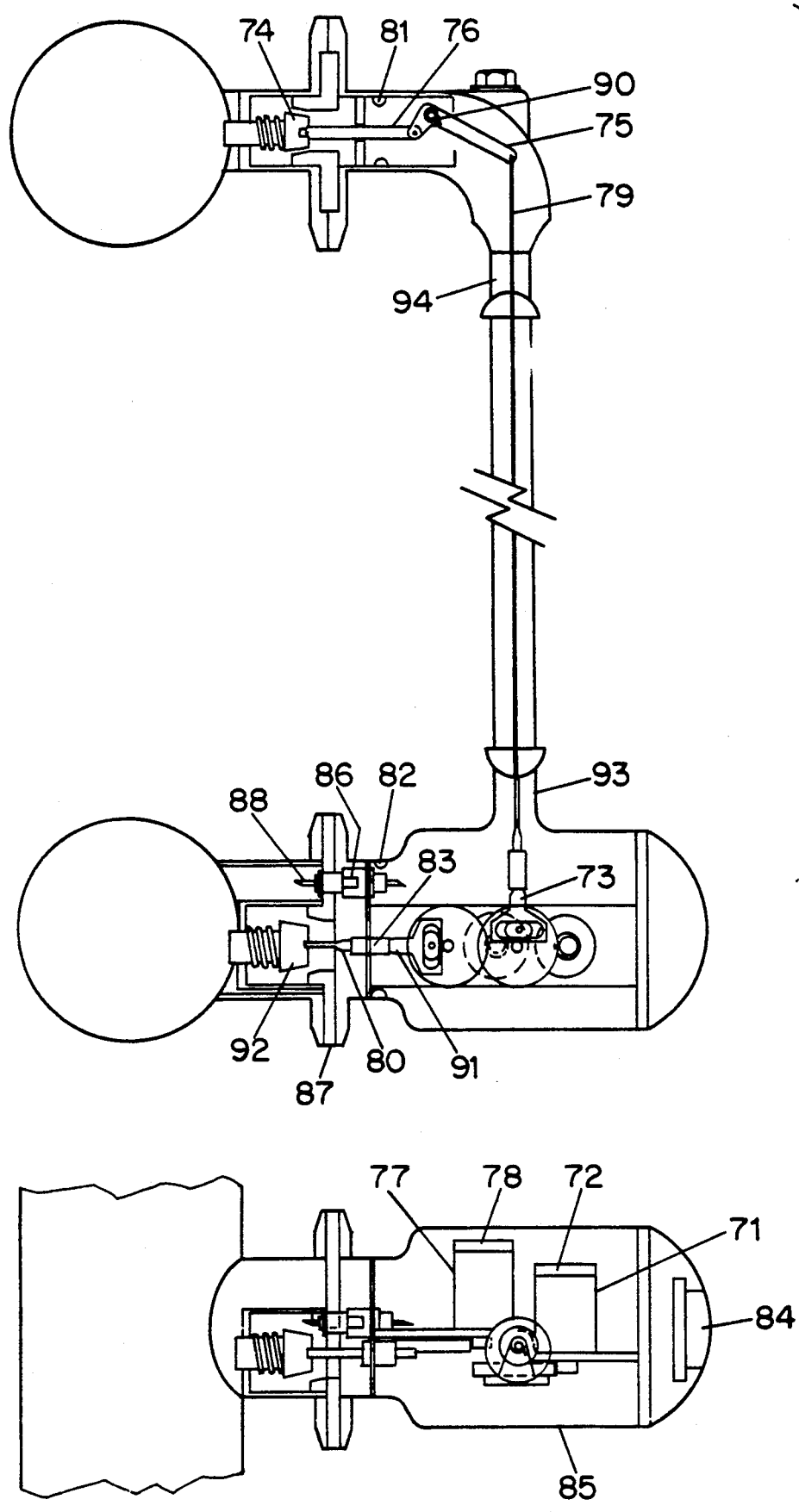
FIG. 7 depicts the high speed modulating/isolating valve and control system.

More detail of the fail-safe modulating/control system is shown in FIG. 7. A permanent magnet servo motor 71 with encoder 72 and positive acting cam 73 controls the inlet valve 74 via an actuating cable 79 extending through one of the microtubes from the outlet port to the inlet port. It provides linkage to a bellcrank 75 and push-rod 76 allowing the module controller to close the inlet valve in the event of a module failure. A torsional spring 90 on the bellcrank 75 keeps the actuating cable 79 taut.

A second permanent magnet servo motor 77 with encoder 78 controls the position of the outlet valve 92 via a push-rod 80 connected to a positive acting cam 91 in response to temperature sensors 81, 82 and pressure/flow sensors 93, 94 in both inlet and outlet ports and in response to signals from central control via the coax to achieve proper fluid flow rate. Dry-lube (polyimide-teflon-graphite) bearing surfaces 83 in the motor and actuator linkage can provide reliable, clean, high speed, precision control. The mass of the control system, servo motors, and valves per module is expected to be less than 0.15 kg. A variety of suitably stable, low mass, thermal sensor options are available, including thermocouples, platinum resistance temperature devices (RTDs), and Johnson noise analyzers.

A microprocessor 84 with communications and supply conditioning, servo drivers, and analog sensor conditioning is mounted inside each module outlet valve housing 85, and connected to the coaxial control line in the main via a sealed feedthrough 86 through the valve bulkhead 87. Simple splitting techniques at each main node 88 will permit the signal bandwidth to extend from 100 kHz to at least 10 MHz, and much higher bandwidths are achievable if necessary. The microprocessor must be radiation hardened, and must be suitable for use at the main's temperature. The radiation hardening could include a layer of depleted uranium (for gamma-ray attenuation) and a layer of gadolinium-157 (for neutron capture) above and below the device.

System reliability will require some redundancy, resulting in extra strings and possibly arrays. These extra units will allow the radiator system to operate at its design point capacity even when some of the units are being serviced. This redundancy also facilitates leak detection. The radiator central control system can simultaneously close all of the valves, including the string and module valves, in an array to test for leaks. Pressure transducers in each main and module will identify any sections with leaks by measuring pressure changes in each section during the test. The radiator central control system can then isolate any sections with leaks until they are repaired.

The valves are normally closed (require actuation for opening). One is located in each main branch port. The rest of the distributed control is located in each module outlet port. The complexity of the right-angle fluid coupling and valve linkage is justified by the serviceability it provides. A defective module may easily be detached from the mains and replaced. The defective module can often be repaired robotically by sputtering molten braze alloy or polymer over the hole, or the module can be taken inside the spacecraft for repair: radiation damaged microprocessors can be replaced; punctured microtubes can be spliced or plugged; mildly damaged header caps can be repaired.

Although this invention has been described herein with reference to specific embodiments, it will be recognized that changes and modifications may be made without departing from the spirit of the present invention. All such modifications and changes are intended to be included within the scope of the following claims.

We claim:

1. A radiator for rejecting heat into space in which a substantial portion of its radiating surfaces comprise an external corrosion-resistant refractory alloy film deposited over heavily oxidized metal alloy, said refractory alloy film being 100 to 800 nanometers thick.

2. The radiator of claim 1 in which said refractory alloy includes at least two elements selected from the group consisting of platinum, rhodium, iridium, ruthenium, and osmium.

* * * * *